United States Patent [19]

Takebayashi

[11] Patent Number: 5,030,982
[45] Date of Patent: Jul. 9, 1991

[54] SINGLE LENS REFLEX CAMERA

[75] Inventor: Tatsuhide Takebayashi, Tokyo, Japan

[73] Assignee: Asahi Kogaku Kogyo Kabushiki Kaisha, Tokyo, Japan

[21] Appl. No.: 546,857

[22] Filed: Jul. 2, 1990

[30] Foreign Application Priority Data

Jul. 6, 1989 [JP] Japan ................. 1-80557[U]

[51] Int. Cl.$^5$ .................... G03B 3/10; G03B 17/14
[52] U.S. Cl. ......................... 354/400; 354/286
[58] Field of Search ............ 354/286, 400, 195.1, 354/152

[56] References Cited

U.S. PATENT DOCUMENTS

| | | | |
|---|---|---|---|
| 4,357,089 | 11/1982 | Okura et al. | 354/286 |
| 4,400,075 | 8/1983 | Tomori et al. | 354/195 |
| 4,413,893 | 11/1983 | Tomori | 354/195 |
| 4,420,239 | 12/1983 | Yasuyuki et al. | 354/286 |
| 4,429,965 | 2/1984 | Enomoto et al. | 354/402 |
| 4,440,484 | 4/1984 | Komoto et al. | 354/286 |
| 4,443,085 | 4/1984 | Tomori et al. | 354/286 |
| 4,457,608 | 7/1984 | Komoto et al. | 354/286 |
| 4,580,887 | 4/1986 | Goto | 354/400 |
| 4,603,955 | 8/1986 | Haneishi | 354/286 |
| 4,653,889 | 3/1987 | Haneishi | 354/286 |
| 4,766,453 | 8/1988 | Shiokama et al. | 354/286 |
| 4,841,322 | 6/1989 | Kawasaki et al. | 354/400 |
| 4,860,043 | 8/1989 | Kurei et al. | 354/286 |

FOREIGN PATENT DOCUMENTS 0271019 6/1988 European Pat. Off. .

Primary Examiner—L. T. Nix
Assistant Examiner—Jae N. Noh
Attorney, Agent, or Firm—Sandler, Greenblum & Bernstein

[57] ABSTRACT

A single lens reflex camera having a camera body, an interchangeable lens which is detachably mounted to the camera body, a focus adjusting mechanism provided in the interchangeable lens, a drive unit which is provided in the camera body to drive the focus adjusting mechanism in the interchangeable lens, and electrical contacts which are provided on the drive unit to transmit and receive electrical signals and/or the electrical power between the camera body and the interchangeable lens.

10 Claims, 4 Drawing Sheets

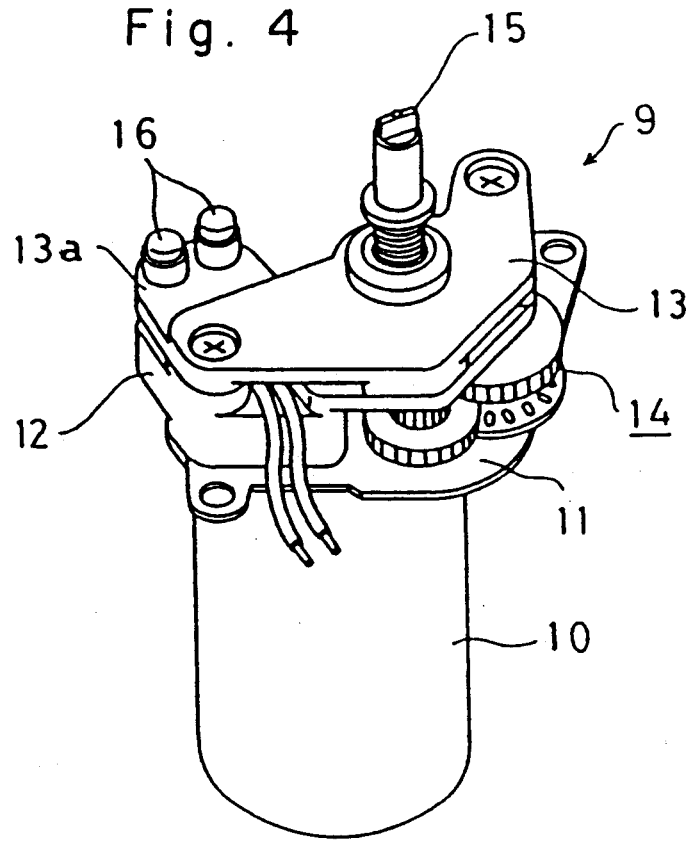
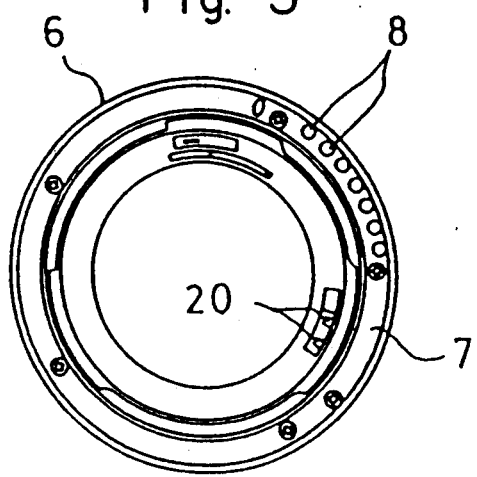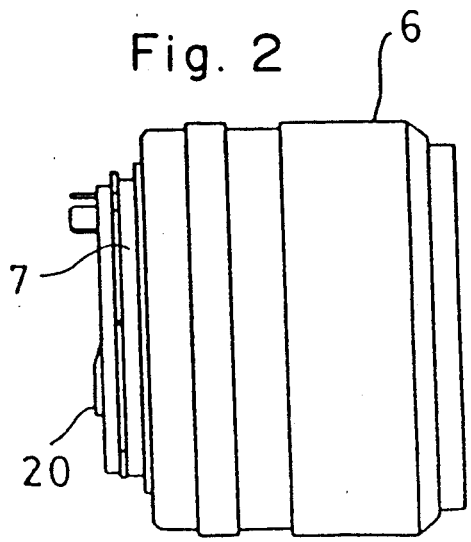

SINGLE LENS REFLEX CAMERA

BACKGROUND OF THE INVENTION

1. Field of the Invention

The present invention relates to a single lens reflex camera, and more precisely it relates to electrical contact mechanism in a single lens reflex camera for transmitting and receiving an electrical power and/ or electrical signals between a camera body and an interchangeable lens.

2. Description of Related Art

In a known single lens reflex cameras, an electrical power and /or electrical signals are transmitted to and camera body, respectively and interchangeable lens to an interchangeable lens or a camera body. To transmit and receive the electrical power and the electrical signals in the form of electric current, it is necessary to provide electrical contacts which are connected on the camera body and the interchangeable lens, respectively, when the interchangeable lens is mounted to the camera body. Usually, the electrical signals which are transmitted from the interchangeable lens to the camera body include information, such as open F-number, focal length data, etc., peculiar to the associated interchangeable lens, which are stored in a ROM or CPU incorporated in the interchangeable lens. However, in a recent interchangeable lens with a powered zoom or a powered diaphragm, there is more information to be transmitted between the camera body and the interchangeable lens. It is also necessary to supply the electrical power to the interchangeable lens from the camera body.

The electrical contacts are usually provided on a lens mount and a body mount, or the vicinity thereof. However, in the vicinity of the lens mount and body mount, there are usually locking and unlocking mechanisms of the interchangeable lens and driving and driven shafts for auto-focusing and power-zooming operations, etc., Hence, there is insufficient space for providing a number of electrical contacts. Consequently, there is required a complicated arrangement of the electrical contacts. Also, it is almost impossible to accommodate an increased number of electrical contacts.

SUMMARY OF THE INVENTION

The primary object of the present invention is to provide a single lens reflex camera having a simple electrical contact mechanism in which a number of electrical contacts can be effectively and easily provided, with an increased freedom of arrangement for the contacts.

The inventor of the present invention has focused on the existence of a a drive unit with a motor provided on the camera body. The drive unit has a drive shaft which is driven by the motor to transmit the drive power, used, for example, for auto-focusing or power zooming, from the camera body to the interchangeable lens. According to one of the most significant features of the present invention, additional electrical contacts on the camera body side are provided on the drive unit, Additional electrical contacts are provided on the interchangeable lens to correspond to, and mate with those on the drive unit.

Namely, according to the present invention, there is provided a single lens reflex camera having a camera body, an interchangeable lens which is detachably mounted to the camera body, a driven member provided in the interchangeable lens, a drive unit which is provided in the camera body to drive the driven member in the interchangeable lens, and a group of electrical contacts for transmitting and receiving electrical signals and/or the electrical power between the camera body and the interchangeable lens, wherein at least a part of the electrical contacts is provided on the drive unit.

The additional electrical contacts on the drive unit can be used with the existing electrical contacts on the body mount or the vicinity thereof. The additional electrical contacts can be used e.g. for a power supply.

With this arrangement, the additional electrical contacts on the existing drive unit provide an increased number of electrical contacts without modifying the existing electrical contacts on the mounts or the vicinity thereof.

BRIEF DESCRIPTION OF THE DRAWINGS

The invention will be described below in detail with reference to the accompanying drawings, in which;

FIGS. 2 and 3 are a side elevational view and a back view of an interchangeable lens having an electrical contact mechanism according to the present invention, respectively;

FIG. 4 is a perspective view of a drive unit provided on the camera body;

DESCRIPTION OF PREFERRED EMBODIMENTS

Figure 1:
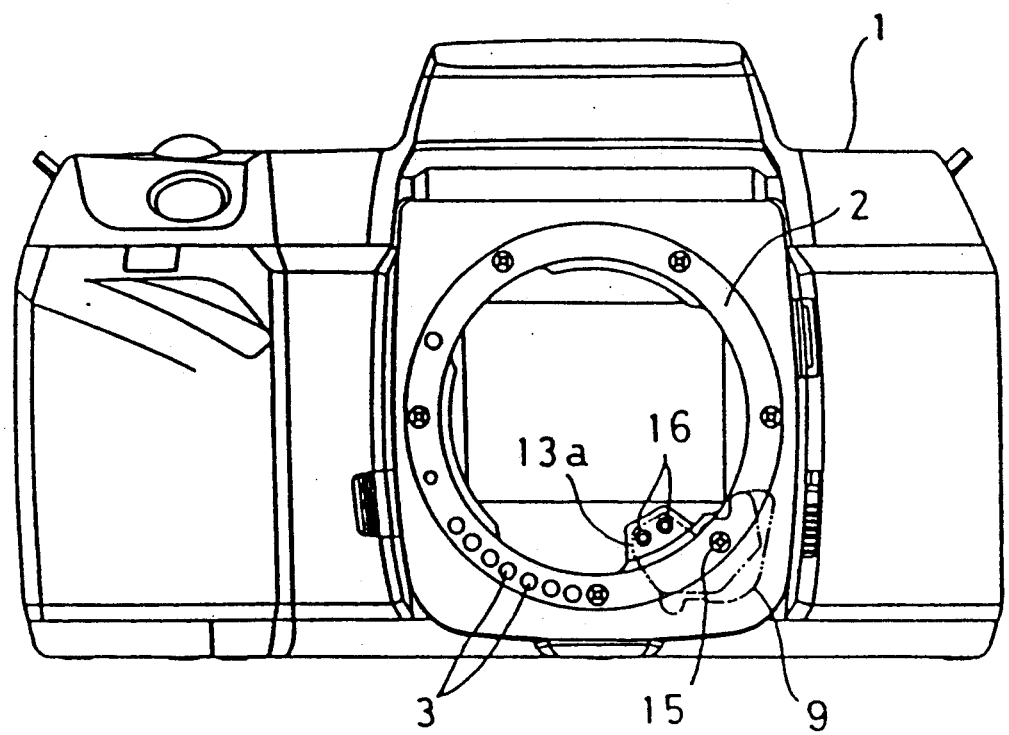
FIG. 1 is a front elevational view of a single lens reflex camera having an electrical contact mechanism according to the present invention.

In FIG. 1, a camera body 1 is provided on its front face with a body mount 2 to which a lens mount 7 of an interchangeable lens 6, as shown in FIGS. 2 and 3, is detachably attached.

On the front end face of the body mount 2 are provided a plurality of electrical contacts 3 to transmit and receive electrical signals and the electrical power between the camera body 1 and the interchangeable lens 6.

A plurality of electrical contacts 8 are provided on the lens mount 7 to be connected to the corresponding electrical contacts 3 of the body mount 2.

In the camera body 1 is provided an auto-focusing drive unit 9 which has a DC motor 10 and a mounting plate 11 for mounting the DC motor 10 to the camera body 1, as shown in FIG. 4. To the mounting plate 11 are mounted first and second support plates 12 and 13 which are put one on another. Between the second support plate 13 and the mounting plate 11 is provided a reduction gear device 14 which reduces the number of revolution of the DC motor 10. The output of the reduction gear device 14 is transmitted to an auto-focus joint, drive shaft 15 which is supported on the second support plate 13.

The auto-focus joint 15 projects forward through the body mount 2 to be connected to an auto-focusing pinion shaft (driven shaft) 21 provided in the interchangeable lens 6. The pinion shaft 21 drives a focus adjusting mechanism 22 (FIG. 6) provided in the interchangeable lens 6.

A ledge 13a is provided on the second support plate 13 which projects in a radially inward direction of the body mount 2, so that a plurality of electrical contacts 16 (a pair of electrical contacts in the illustrated embodiment) are provided on the ledge 13a to transmit and receive the electrical signals between the interchangeable lens 6 and the camera body 1. The electrical contacts 16 are located substantially along a smaller radius circle than the circle along which the electrical contacts 3 are located. Furthermore, the electrical contacts 16 are located more axially inwardly (at a deeper position in the camera) than the electrical contacts 3, when viewed in the optical axis direction of the camera.

Figure 5:
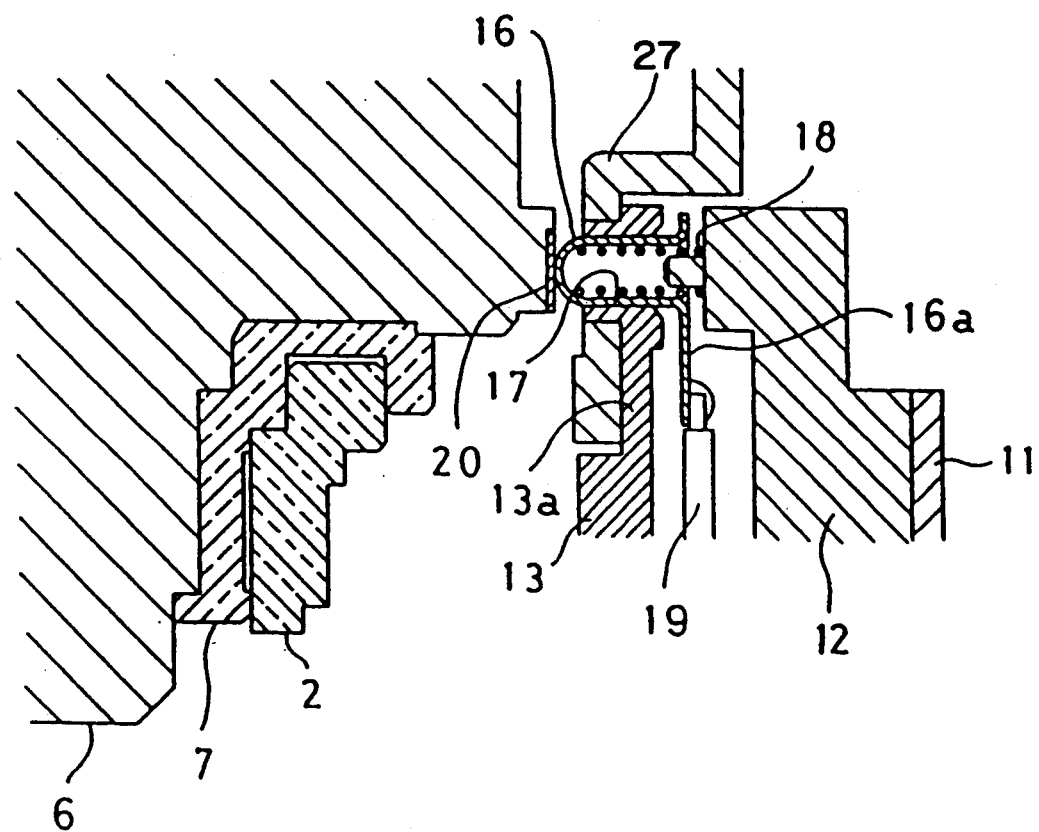
FIG. 5 is a sectional view of a connecting mechanism of electrical contacts when an interchangeable lens is mounted to a camera body; and, FIG. 6 is a block diagram showing an electrical connection between a camera body and an interchangeable lens to transmit and to receive electrical signals therebetween.

Each of the electrical contacts 16 is made of a cylindrical body having a spherical front end, as shown in FIG. 5 and is slidably fitted in a corresponding through hole 17 formed in the ledge 13a of the second support plate 12. The electrical contacts 16 are continuously biased by associated compression springs 18 which are provided between the electrical contacts 16 and the first support plate 13 to project outward. Lead pieces 16a provided on the base ends of the electrical contacts 16 are connected to conductor wires 19 soldered thereto.

Figure 6:
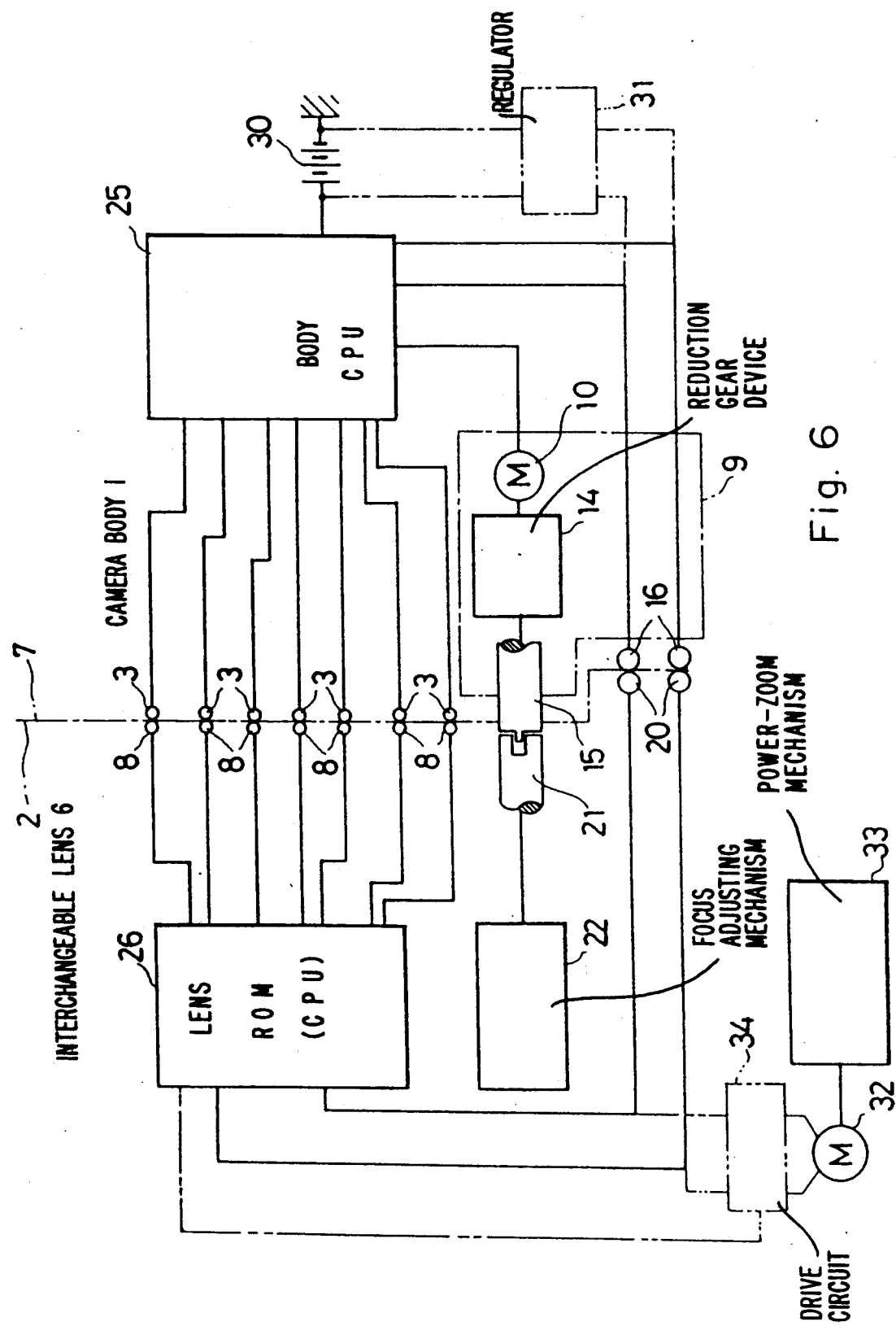
Figure 5:
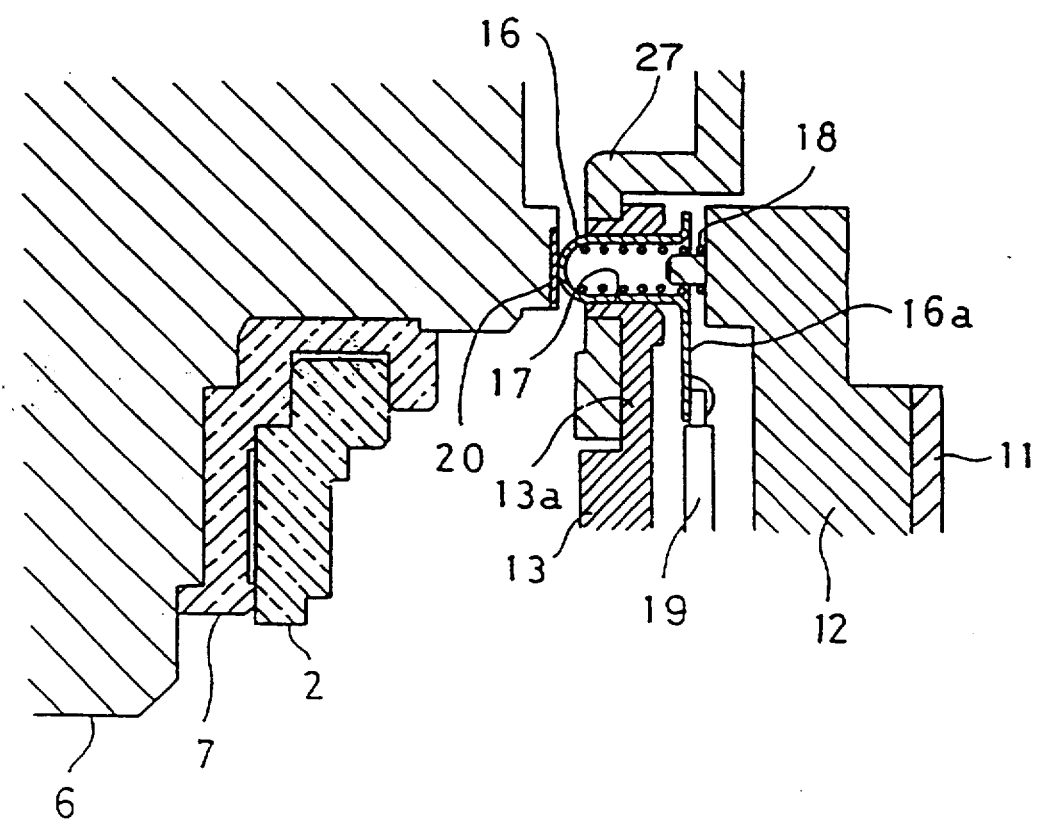

The interchangeable lens 16 has immovable electrical contacts 20 thereon which are connected to the corresponding electrical contacts 16, as shown in FIGS. 2 and 3. The electrical contacts 3 and 16 on the camera body side are connected to a body CPU 25 of the camera body 1 and the electrical contacts 8 and 20 are connected to a lens ROM (or CPU) 26 of the interchangeable lens, as shown in FIG. 6. Note that numeral 27 in FIG. 5 designates a light intercepting plate.

The interchangeable lens 6 is detachably mounted to the camera body 1 through the lens mount 7 and the body mount 2 which is engaged by the lens mount.

When the interchangeable lens 6 is mounted to the camera body 1, the electrical contacts 16 provided on the auto-focusing drive unit 9 are brought into pressing contact with the corresponding electrical contacts 20 of the interchangeable lens 6, so that an electrical connection is established therebetween. As a result, the electrical signals are transmitted between the body CPU 25 on the camera body 1 and the lens ROM 26 on the interchangeable lens 6.

When the interchangeable lens 6 is mounted to the camera body 1, as shown in FIG. 5, the electrical contacts 3 and 8 provided on the body mount 2 and the lens mount 7 are electrically connected to each other, so that the electrical signals can be transmitted between the body CPU 25 of the camera body 1 and the lens ROM 26 of the interchangeable lens 6.

As can be seen from the foregoing, according to the present invention, the electrical contacts of the camera body which are used to transmit the electrical signals between the camera body 1 and the interchangeable lens 6 are provided on the existing auto-focusing drive unit 9. Consequently, the incorporation of the electrical contacts 16 in the auto-focusing drive unit can be more easily effected in advance, in comparison with the case where electrical contacts corresponding to the electrical contacts 16 are newly provided on the body mount 2. This also results in a simpler and less expensive arrangement of additional electrical contacts.

Furthermore, since the electrical contacts 16 are continuously biased by the compression springs 18 to project toward the electrical contacts 20 of the interchangeable lens 6, the electrical contacts 16 are more stably connected to the corresponding electrical contacts 20.

It is also possible to use the electrical contacts 16 and 20 for use in a power supply. In FIG. 6, the dash and dotted lines designate such an alternative in which the electrical contacts 16 and 20 are used for power supply. In this alternative, a power source 30 provided on the camera body 1 is connected to the electrical contacts 16 through a regulator 31. The interchangeable lens 6 has therein a power-zoom mechanism 33 which is driven by a motor 32, so that a drive circuit 34 of the motor 32 is connected to the electrical contacts 20. The drive circuit 34 receives a command from the lens CPU 26. In the alternative, the electrical contacts 20 are not connected to the lens CPU 26. The electrical contacts 16 and 20 are used in a power supply to drive the power zoom mechanism 33. The power can be of course supplied to a device other than the power zoom mechanism 33.

The arrangement and the number of the electrical contacts 16 to be provided on the auto-focusing drive unit 9 are not limited to those in the illustrated embodiment. In the case where a drive unit for the power-zooming operation (power-zooming drive unit) is provided on the camera body, it is possible to provide the electrical contacts on the power-zooming drive unit.

I CLAIM:

1. A single lens reflex camera comprising a camera body, an interchangeable lens which is detachably mounted to the camera body, a driven member provided in the interchangeable lens, a drive unit which is provided in the camera body to drive the driven member in the interchangeable lens, and a group of electrical contacts for transmitting and receiving electrical signals and/or electrical power between the camera body and the interchangeable lens, wherein at least some of the electrical contacts are provided on the drive unit.

2. A single lens reflex camera according to claim 1, wherein the driven member in the interchangeable lens is a focus adjusting mechanism.

3. A single lens reflex camera according to claim 2, wherein the drive unit provided in the camera body is an auto-focusing drive unit for driving the focus adjusting mechanism of the interchangeable lens.

4. A single lens reflex camera according to claim 1, wherein the interchangeable lens has a power zoom mechanism as another driven member, so that the electrical contacts provided on the drive unit are used for supplying power to a motor for the power zoom mechanism.

5. A single lens reflex camera according to claim 1, further comprising a body mount for the camera body and a lens mount for the interchangeable lens, wherein additionally ones of said electrical contacts are provided on the body mount and the lens mount, respectively.

6. A single lens reflex camera according to claim 5, wherein said electrical contacts provided on the drive unit are located radially inwardly of said electrical contacts on the body mount or the lens mount.

7. A single lens reflex camera according to claim 6, wherein the electrical contacts provided on the drive unit are located at an axially innermost from the electrical contacts on the body mount or the lens mount.

8. A single lens reflex camera according to claim 1, further comprising means for biasing the electrical contacts provided on the drive unit toward the interchangeable lens.

9. A single lens reflex camera according to claim 8, wherein the electrical contacts provided on the interchangeable lens, to be connected to the electrical contacts provided on the drive unit, are immovable contacts.

10. A single lens reflex camera comprising a camera body, an interchangeable lens which is detachably mounted to the camera body, a focus adjusting mechanism provided in the interchangeable lens, a drive unit which is provided in the camera body to drive the focus adjusting mechanism in the interchangeable lens, and electrical contacts which are provided on the drive unit to transmit and receive electrical signals and/or electrical power transmitted between the camera body and the interchangeable lens.

* * * * *

UNITED STATES PATENT AND TRADEMARK OFFICE
CERTIFICATE OF CORRECTION

PATENT NO. : 5,030,982
DATED : June 9, 1991
INVENTOR(S) : T. TAKEBAYASHI

It is certified that error appears in the above-indentified patent and that said Letters Patent is hereby corrected as shown below:

At column 4, line 65, (claim 7, line 3) insert ---position--- after "innermost".

Signed and Sealed this

Fourteenth Day of November, 1995

Attest:

BRUCE LEHMAN

Attesting Officer    Commissioner of Patents and Trademarks